United States Patent [19]

Pace

[11] Patent Number: 4,804,076
[45] Date of Patent: Feb. 14, 1989

[54] PIECE-SPACING TRANSFER MECHANISM

[75] Inventor: Vincent C. Pace, Redmond, Wash.

[73] Assignee: Formost Packaging Machines, Inc., Woodinville, Wash.

[21] Appl. No.: 51,106

[22] Filed: May 14, 1987

[51] Int. Cl.$^4$ ............................................. B65G 37/00
[52] U.S. Cl. .................................. 198/475.1; 198/456
[58] Field of Search ...................... 198/475.1, 461, 457, 198/456, 459

[56] References Cited

U.S. PATENT DOCUMENTS

| | | | |
|---|---|---|---|
| 2,888,125 | 5/1959 | Engelson et al. | 198/456 X |
| 3,409,115 | 11/1968 | Porcard | 198/456 X |
| 3,453,800 | 7/1969 | Mahncke | 198/456 X |
| 4,006,813 | 2/1977 | Fluck | 198/461 X |
| 4,380,283 | 4/1983 | Maanen | 198/456 |

FOREIGN PATENT DOCUMENTS

| | | | |
|---|---|---|---|
| 1127109 | 7/1982 | Canada | 198/456 |
| 2055734 | 3/1981 | United Kingdom | 198/456 |

Primary Examiner—Robert J. Spar
Assistant Examiner—D. Glenn Dayoan
Attorney, Agent, or Firm—Robert W. Beach, Ward Brown

[57] ABSTRACT

A disk carrying bell cranks in circumferentially spaced relationship is located at the side of a supply conveyor opposite a discharge conveyor and the attitude of the bell cranks is controlled by cam followers carried by the bell cranks engaging a stationary cam for the purpose of moving bell crank arms to poke pieces moved in abutment by the supply conveyor onto the discharge conveyor for movement by it in uniformly spaced relationship.

9 Claims, 3 Drawing Sheets

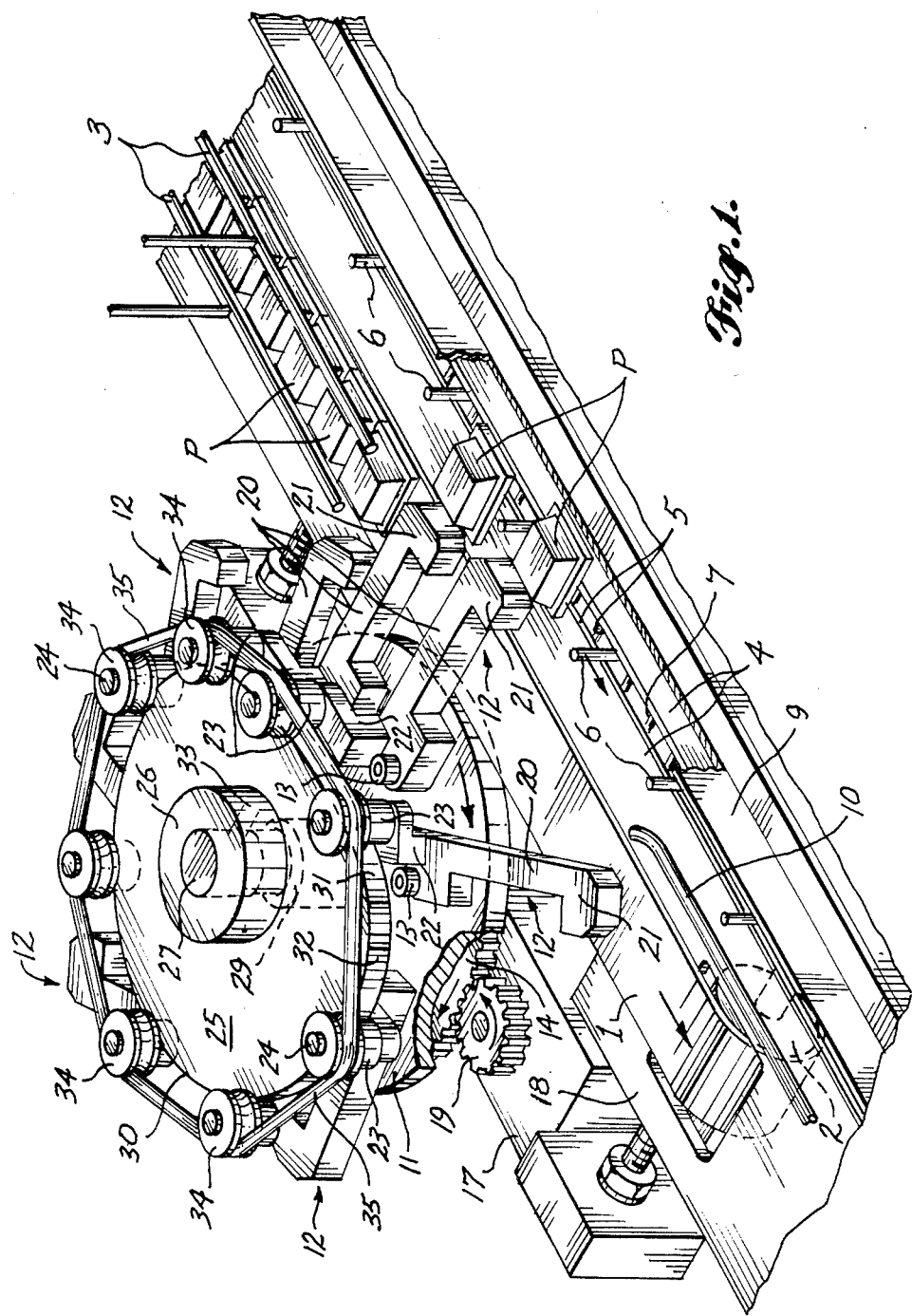

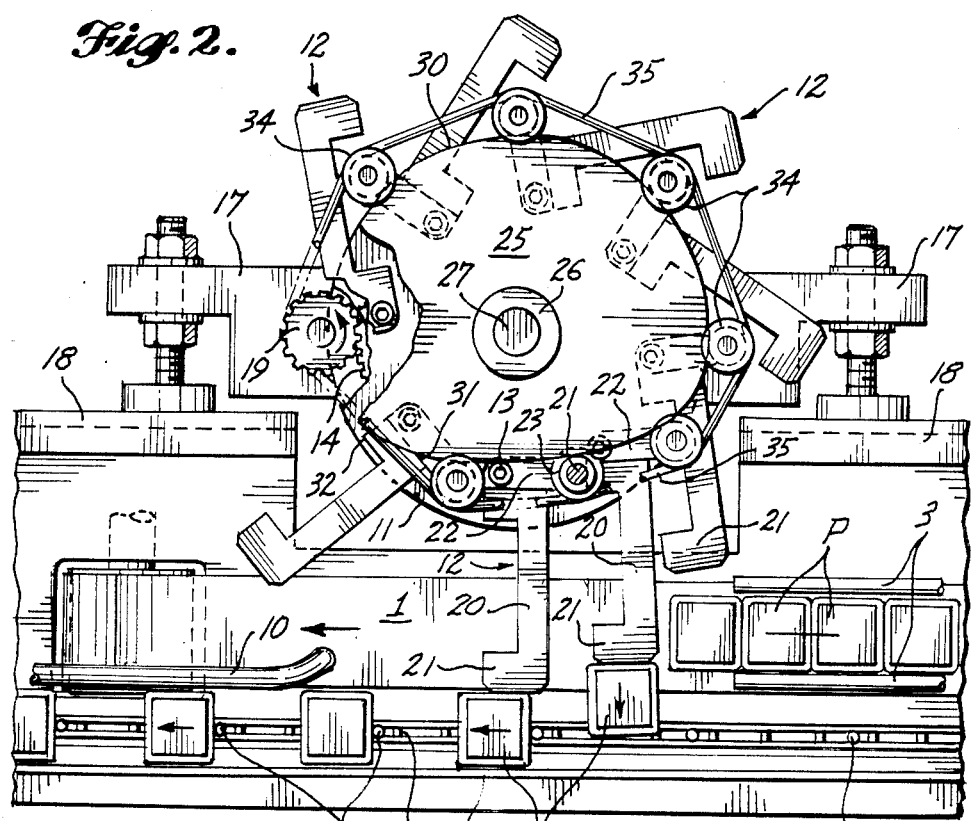
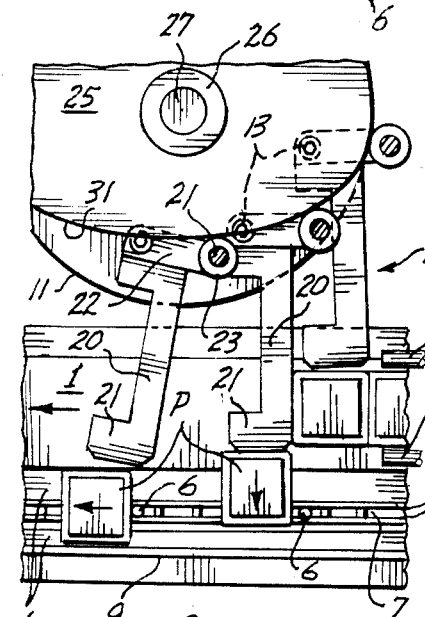
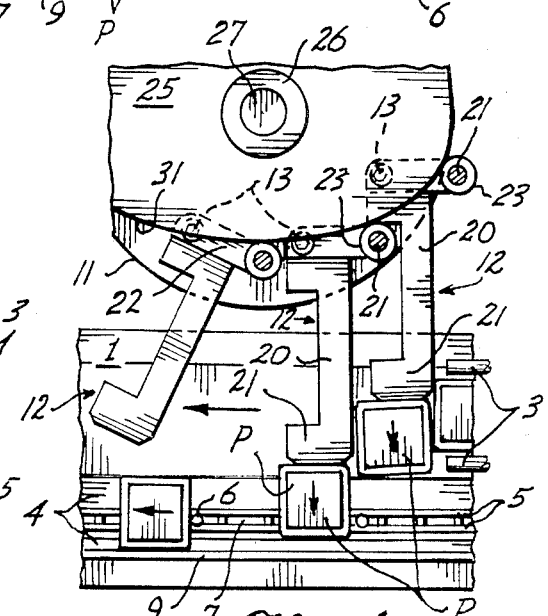

PIECE-SPACING TRANSFER MECHANISM

BACKGROUND OF THE INVENTION

1. Field of the Invention

This invention relates to mechanism for transferring pieces from a supply conveyor moving such pieces in abutting relationship to an adjacent discharge conveyor moving such pieces in spaced relationship.

2. Problem

In operations for making pieces of various types, such as of candy, it is convenient to transport such pieces in abutting relationship. For counting and packaging such pieces, on the other hand, it is usually desirable for the pieces to be conveyed in a row in spaced relationship. The problem solved by the present invention is to transfer such pieces from a supply conveyor in which they are being moved in abutting relationship to a discharge conveyor in which they are moved in uniformly spaced relationship.

3. Prior Art

The same problem addressed in making the present invention was considered in U.S. Pat. No. 4,380,283, issued Apr. 19, 1983. The mechanism of that patent utilizes conjointly rotating disks, and the present invention utilizes a different type of mechanism.

SUMMARY OF THE INVENTION

It is a principal object of the present invention to provide piece-spacing transfer mechanism which is compact so that the parts have little inertia and can be moved to operate at high speed.

Another object of the invention is to provide transfer mechanism which is very versatile and can be designed to transfer pieces of different sizes and shapes.

It is also an object to provide mechanism of simple construction.

The foregoing objects can be accomplished by mechanism including a driven rotary disk carrying a circular row of bell cranks having their fulcrum pivots spaced equidistantly radially from the center of rotation of the disk, such bell cranks having thrust arms at the outer sides of their pivots and having side control arms carrying cam follower rollers held in engagement by an encircling band with the periphery of a generally circular control cam. Such cam has a somewhat flattened side adjacent to parallel piece supply and discharge conveyors for controlling swinging of the thrust arms of the bell cranks as the carrier disk is rotated to push pieces in abutment on the supply conveyor off such supply conveyor and onto the discharge conveyor for engagement by pins of the discharged conveyor to continue movement of the pieces in the same general direction but in uniformly spaced apart relationship.

BRIEF DESCRIPTION OF THE DRAWINGS

FIG. 1 is a top perspective of the transfer mechanism with parts broken away.

FIG. 2 is a plan of the transfer mechanism with parts broken away, and FIGS. 3 and 4 are fragmentary plans of the mechanism showing parts in different successive operating positions.

DETAILED DESCRIPTION

Figure 5:
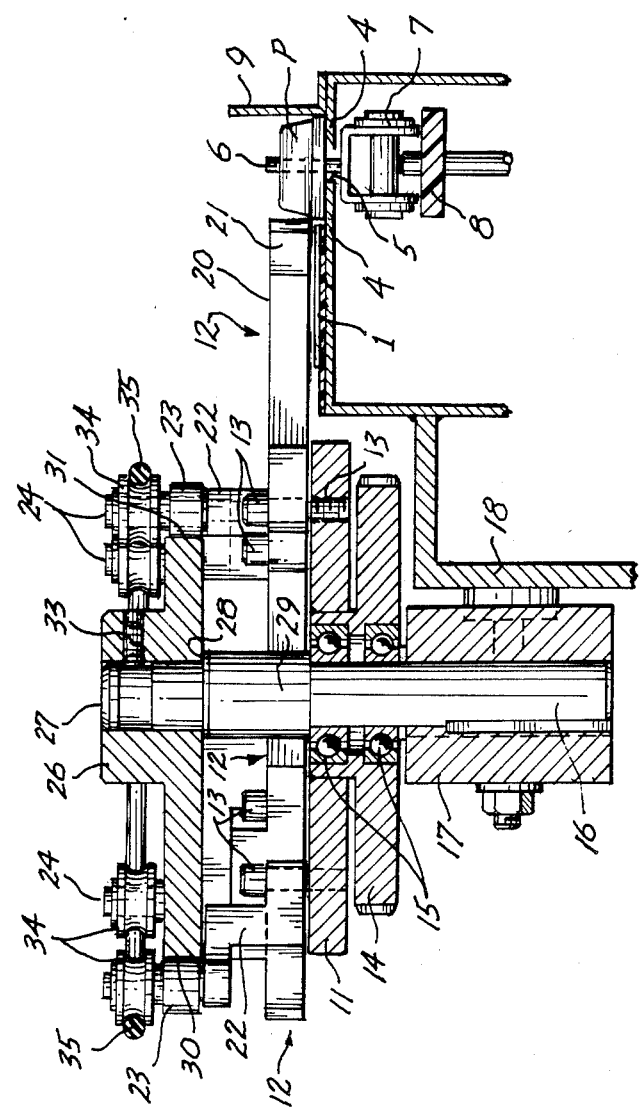
FIG. 5 is a vertical section taken on line 5—5 of FIG. 2.

The pieces P to be separated and accelerated are supplied to the transfer mechanism in abutting relationship on a flat belt conveyor 1 that is mounted on pulleys 2. The pieces are restrained from being displaced appreciably laterally of the conveyor belt by side rails 3 mounted above and alongside the conveyor belt. The pieces are pushed off the belt 1 by the transfer mechanism in the direction transversely of the direction of movement of the belt and incoming pieces P onto ways 4 at opposite sides of a slot 5 through which posts or pegs 6 project upward from a conveyor chain 7. Such chain slides on a supporting rail 8, as shown in FIG. 5.

The transfer mechanism operates at high speed so that when pieces are pushed off the conveyor belt 1 onto the ways 4 their momentum would tend to carry them beyond the line of conveyor pegs 6. The pieces are stopped by striking a wall or fence 9 extending along the side of the discharge conveyor opposite the supply conveyor. Also, it is desirable to provide a guardrail 10 extending parallel to the fence 9 and located at the side of the discharge conveyor at a location beyond the station where pieces are loaded from the supply conveyor onto the discharge conveyor.

The supply conveyor defined by the belt 1 and the discharge conveyor defined by the pegs 6 are located in adjacent relationship as shown in FIGS. 1, 2, 3 and 4, and the transfer mechanism is located generally at the side of supply conveyor 1 opposite or remote from the discharge conveyor. Such transfer mechanism includes a pusher-mounting disk 11 on which a circular row of pushers 12 is mounted by pivots 13 located in a circle concentric with the rotative axis of the carrier disk. Such disk is keyed to a drive gear 14 concentric with the disk and mounted on spaced antifriction radial and thrust bearings 15 encircling a stationary post 16 that is supported by a mounting block 17 mounted on base 18. Such mounting block also carries a drive pinion 19 meshing with the drive gear 14.

Each pusher 12 is a bell crank including a thrust arm 20 located generally outwardly of its pivot 13 and having a pusher head 21 on its swinging end of a shape suitable for engagement with the pieces P to push them off the supply conveyor belt 1. Each bell crank also has a side control arm 22 projecting transversely of the thrust arm 20 and carrying a cam roller 23 mounted on a shaft 24 offset from the pivot 13 of the bell crank transversely of the thrust arm. Such cam roller is engageable with the periphery of a stationary generally circular cam 25 located generally concentrically with the axis of the bell crank mounting 11. The cam disk has a hub 26 mounted on the upper reduced end of a shaft 27. Such cam rests on a shoulder 28 formed at the base of such reduced end by the boss 29.

The cam 25 is generally circular in the sense that the major portion 30 of its periphery is a circular arc, but the cam periphery has a somewhat flattened portion 31 of less sharp curvature adjacent to the supply conveyor and the discharge conveyor, as shown in FIGS. 2, 3 and 4. This cam periphery portion of less sharp curvature is faired into the circular arcuate portion 30 of the cam by portions 32 of sharper curvature. The angular positioning of the less sharply curved portion 31 of the cam relative to the conveyors can be adjusted by turning the cam 25 about the axis of shaft 27 and then locking the cam in the proper adjusted position by a setscrew 33 extending through the cam hub 26 and bearing against a groove in the reduced portion of shaft 27. To hold the cam rollers 23 in engagement with the periphery of cam 25 as the bell crank carrier disk 11 revolves relative to the cam, pulleys 34 are mounted on the upper ends of shafts 24 carried by the side arms 22 of the bell cranks and a resilient endless band 35 encircles all of the pulleys 34 to effect the inward pressure of the cam rollers against the periphery of cam 25.

As the bell cranks 12 are moved orbitally by rotation of carrier disk 11, such bell cranks are swung relative to the carrier disk in a controlled manner so that as each bell crank approaches the supply conveyor 1 its thrust arm 20 will assume an attitude generally perpendicular to the supply and discharge conveyors. As such thrust arm is moved lengthwise toward the conveyors it will poke a piece P from the supply conveyor onto the discharge conveyor and then be retracted. Such control of the attitude of the bell crank thrust arm 20 will be accomplished by swinging of the bell crank side arm 22 effected by engagement of the cam follower roller 23 with the generally flattened peripheral portion 31 of the cam 25.

As shown best in FIGS. 2, 3 and 4, when the carrier disk 11 is in a rotative position such that the cam roller 23 of a bell crank 12 is pressed by the band 35 against the circular arc portion 30 of the cam disk 25, the side arm 22 of the bell crank will extend generally radially of the disk 11 and cam 25, whereas the thrust arm 20 will extend generally tangentially of the disk 11 and cam 25 projecting forward in the direction of rotation of the disk 11. Such disk will be rotated by the drive pinion 19 and gear 14 in a direction such that the portion of the disk periphery closest to the supply conveyor 1 will be moving generally parallel to the direction of movement of the supply conveyor.

As the cam roller 23 of a bell crank reaches the more sharply curved portion 32 of the periphery of cam 25 when the bell crank approaches the conveyor 1, the bell crank will be swung counterclockwise about its pivot 13 relative to mounting disk 11, as shown best in FIGS. 3 and 4, so as to swing the pusher arm 20 of the bell crank into a position generally perpendicular to the supply conveyor 1. As the disk 11 continues to turn, the cam roller 23 will roll from the more sharply curved arc 32 of cam 25 onto the less sharply curved arc 31 of the cam, which will continue the swing of the bell crank thrust arm 20 in a counterclockwise direction relative to disk 10 so that the pusher arm continues to be held in the attitude generally perpendicular to the supply conveyor and the discharge conveyor through an angle of at least 30 degrees, and preferably from 60 to 90 degrees, until after the crank arm pivot 13 has passed the radius of the disk 11 which is perpendicular to the two conveyors.

During this swinging of the bell crank, the thrust arm 20 will reach an attitude extending substantially radiallly of disk 11 when pivot 13 has just passed the radius of that disk perpendicular to the supply conveyor 1 while the side arm 22 of the bell crank extends substantially chordwise or tangentially of disk 11. At that point the pivot 13 and crank arm will begin to recede from the conveyors and the side arm 22 can continue to swing in a counterclockwise direction about pivot 13 to withdraw the thrust arm smoothly from the piece. The shape of the cam periphery can then be such as to effect swinging of the crank arm abruptly in a clockwise direction relative to disk 11 as the cam follower roller 23 rounds the more sharply curved portion 32 of the cam on the receding side of the rotation of disk 11 so that again the side arm of the bell crank will extend approximately radially of the disk 11 and cam 25 and the thrust arm of the bell crank will extend substantially tangentially forward from the pivot 13.

During the portion of the rotation of disk 11 when the swung position of a bell crank relative to the disk 11 is maintaining the thrust arm of the bell crank in a position substantially perpendicular to the conveyors, the rotation of the disk will be moving the bell crank toward the conveyors at a progressively reduced rate until after the bell crank pivot 13 has passed the radius of disk 11 perpendicular to the conveyors. At the same time the speed of the bell crank in the direction parallel to the movement of the conveyors will be increasing to a maximum at the point where the bell crank pivot 13 passes the radius of disk 11 which is perpendicular to the conveyors. The circumferential speed of the circle of pivots 13 should be approximately the same as the speed of the supply conveyor 1 so that a piece can be slid smoothly off such conveyor without appreciably retarding movement of the pieces by such conveyor. The speed of conveyor pins 6 will be greater than the speed of conveyor 1 so that a piece will be poked between conveyor posts 6 to be picked up and accelerated abruptly by the engagement of the next post 6 with such piece.

The transfer mechanism is very versatile so that it can be adapted for operation to transfer pieces of different size and to provide for accelerating such pieces of different size from positions in which such pieces are in abutment as moved by conveyor 1 into different uniformly spaced relationships effected by pegs 6 of the discharge conveyor. The width of the pieces will dictate the distance that the pieces must be shifted during the transfer operation. Such distance in turn will dictate the radius of the circle of crank arm pivots 13 and the lengths of the thrust arms. The size of the pieces lengthwise of the supply conveyor will also dictate the number of bell cranks required to be mounted on disk 11 in order to transfer all of the pieces from the supply conveyor 1 to the discharge conveyor. The number of bell cranks required will determine the circumferential spacing of the pivots 13 around the pivot circle.

There is also the choice of having the cam rollers 23 arranged to trail the pivots 13 of the bell cranks, as shown in the drawings, or the mechanism could be designed for the cam follower rollers 23 to lead the bell crank pivots 13 in the direction of rotation of carrier disk 11 which would require that the periphery of cam 25 be redesigned appropriately.

In addition, the length of the thrust arms 20 will affect the distance by which the carrier disk 11 is offset from the supply conveyor, the lengths of the side arms 22 of the bell cranks and the size and to some extent the shape of the cam disk 25. Such design parameters can be selected with minimum experimentation to suit the particular application of the transfer mechanism.

I claim:

1. In piece-spacing transfer mechanism including a supply conveyor for supplying pieces in substantially abutting relationship, a discharge conveyor parallel to the supply conveyor and moving in the same direction for transporting in spaced apart relationship pieces received from the supply conveyor, a power-driven rotary disk mounted adjacent to the supply conveyor and at the side of the supply conveyor opposite the discharge conveyor, a circular row of pushers carried by the rotary disk, pivots spaced equidistantly radially from the pivot axis of the disk and pivotally mounting the pushers on the disk and means for swinging the pushers relative to the disk to enable the pushers to engage successive pieces on the supply conveyor and push them onto the discharge conveyor in a direction perpendicular to the directions of movement of the conveyors, the improvement comprising the pushers being bell cranks having thrust arms for engagement with the pieces to be transferred from the supply conveyor to the discharge conveyor and side control arms, a stationary cam superposed with respect to the carrier disk, and cam followers carried by said side control arms of said bell cranks and engageable with the periphery of said cam, the major portion of the periphery of said cam being of circular arcuate shape concentric with the axis of rotation of the carrier disk and a portion of the periphery of said cam adjacent to the conveyors being somewhat flattened to effect swinging of said bell cranks relative to said carrier disk as they approach the conveyors to direct the thrust arms of said bell cranks into attitudes generally perpendicular to the directions of movement of the conveyors for pushing pieces from the supply conveyor onto the discharge conveyor transversely of the direction of movement of the conveyors.

2. In the piece-spacing transfer mechanism defined in claim 1, the generally flattened portion of the cam periphery including a portion of less sharp curvature faired into the circular arcuate portion of the cam periphery by portions of sharper curvature.

3. In the piece-spacing transfer mechanism defined in claim 1, the thrust arms of the bell cranks being elongated.

4. In the piece-spacing transfer mechanism defined in claim 3, the end of each thrust arm remote from the bell crank pivot having a head engageable with pieces to be transferred from the supply conveyor to the discharge conveyor.

5. In the piece-spacing transfer mechanism defined in claim 1, an endless band engageable with the bell crank side control arms for holding the cam followers against the cam periphery.

6. In the piece-spacing transfer mechanism defined in claim 5, the side control arms of the bell cranks having pulleys engageable by the endless band.

7. A process for transferring pieces moved in abutment by a supply conveyor onto an adjacent discharge conveyor in spaced apart relationship by rotating a circular carrier disk carrying a circular row of bell cranks mounted thereon, each bell crank including a thrust arm, which comprises maintaining the bell cranks in constant positions relative to the mounting disk during the major portion of each disk revolution and as each bell crank nears its position of closest approach to the conveyors swinging such bell crank relative to the mounting disk so that, over an appreciable arc of movement of such bell crank, the thrust arm of the bell crank is maintained substantially perpendicular to the direction of movement of the supply and discharge conveyors for engaging and pushing a piece from the supply conveyor to the discharge conveyor in a direction generally perpendicular to the direction of movement of the conveyors.

8. The process for transferring pieces defined in claim 7, including maintaining the thrust arm of the bell crank adjacent to the supply and discharge conveyors generally perpendicular to movement of such conveyors during rotation of the disk through an angle of at least approximately 30 degrees.

9. The process for transferring pieces defined in claim 7, including maintaining the thrust arm of the bell crank adjacent to the supply and discharge conveyors generally perpendicular to movement of such conveyors during rotation of the disk through an angle in the range of 60 degrees to 90 degrees.

* * * * *